Patented Aug. 18, 1942

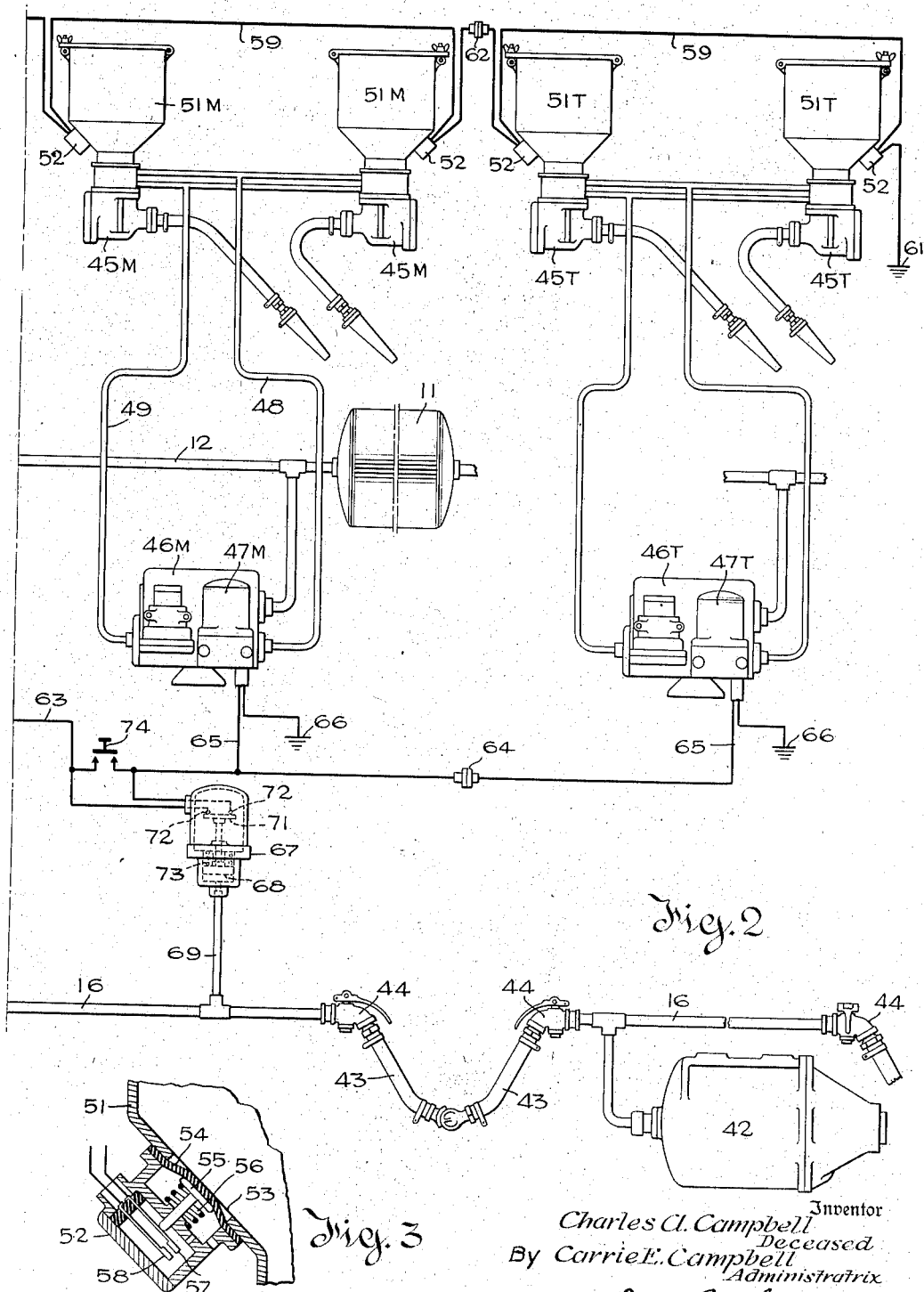

2,293,110

UNITED STATES PATENT OFFICE 2,293,110

SANDING CONTROL FOR BRAKE SYSTEMS

Charles A. Campbell, deceased, late of Watertown, N. Y., by Carrie E. Campbell, administratrix, Watertown, N. Y., assignor to The New York Air Brake Company, a corporation of New Jersey Application November 25, 1940, Serial No. 367,143

10 Claims. (Cl. 303—1)

This invention relates to track sanding devices and particularly to a means for imposing a secondary control on an airbrake system according to the condition of a related sanding system.

With increase in train speeds there has been a tendency to use higher and higher braking ratios in an effort to maintain the maximum stopping distance within a limit suited to conventional signal spacing. The necessity for sanding during all except very light applications has arisen from the increased tendency for wheel sliding to occur.

The principle underlying the invention is to provide for sanding as an incident to any brake application or as an incident to any brake application exceeding a given intensity, and then to provide secondary means, which become active in the event that the sanding system is inoperative, and thus serve to limit the intensity of brake application which may be had.

The invention derives its greatest utility in conjunction with so-called high speed brake systems in which the intensity of brake application is modulated in accordance with train speed or in accordance with the deceleration rate produced by a brake application. This greater utility arises from the fact that systems of the stated types produce applications which are of the maximum intensities permissible for the changing train speed throughout the stop. Because such systems are complicated and would require elaborate descriptions of features not directly concerned with the invention, the invention will be here described as applied to a straight air brake system without deceleration or speed control, but with the understanding that the addition of these features or the use of one of the more complicated brake systems does not preclude the use of the invention.

A simple embodiment will now be described as applied to an ordinary straight air brake system for a two-car train, by reference to the accompanying drawings, in which:

Figures 1 and 2, when assembled from left to right in the order stated, produce a diagram of the braking system, the parts being shown in elevation except for certain components which are shown in section.

Figure 3 is a fragmentary view of a typical safety control device which senses the operative condition of the sanding system.

Generally stated, the invention contemplates the use of any switch device which may be closed or open, depending on whether or not the sanding system is or is not in operative condition. For simplicity, and as a typical embodiment, a switch which is closed when the related sanding box is charged with sand and open when the sand box is empty has been chosen. Obviously this is merely one of several conditions which might render a sanding system inoperative, and the invention may be elaborated by the substitution or addition of other switches which respond to other conditions indicating inoperativeness.

Referring first to Figures 1 and 2, the main reservoir 11, which is charged from any suitable source, such as a compressor (not shown), furnishes the operating air both for the brakes and for the sanders. It should be understood that the sanders are associated with wheels which are braked by the brakes.

The reservoir 11 is connected by a supply line 12 with the engineer's brake valve 13 which is of any suitable straight air type. Such a valve has an application position in which it connects the main reservoir with the brake pipe, a release position in which it interrupts this connection and connects the brake pipe with atmosphere, and a lap position in which all flow paths are closed at the brake valve. Thus the brake valve 13 has an exhaust connection 14 and a branch connection 15 which, in an ordinary system, would lead directly to the brake pipe 16. The operating handle for the engineer's brake valve is indicated at 17.

Interposed between the branch 15 and the brake pipe 16, in parallel, are two valve mechanisms, namely a normally open pressure operated stop valve generally indicated by the numeral 18 and a pressure limiting valve generally indicated by the numeral 19.

The stop valve 18 has a valve seat 21 which may be closed by a flexible diaphragm 22. A second or motor diaphragm 23 reacts upon the valve diaphragm 22 through a thrust button 24 interposed between the two diaphragms. The space between the diaphragms is vented to atmosphere at 25, and the parts are so arranged that the valve diaphragm 22 opens from the seat 21 unless pressure be admitted against the motor diaphragm 23 through the pipe 26.

When flow through the stop valve 18 is interrupted, the sole connection between the engineer's brake valve 13 and the pipe 16 is afforded by the pressure limiting valve 19. This is connected at 27 with the connection 15 of the engineer's brake valve and is connected by the pipe 28 with the brake pipe 16. In the path of flow by the pipe 27 to the pipe 28 are interposed a flow controlling choke 29 and a ball check valve 31 which is confined by a cup-like seat member 32 and so arranged that when the ball 31 is allowed to descend it closes against seat 32, preventing flow from pipe 27 to pipe 28, but even then readily unseats to permit reverse flow. Thus release of the brakes is not obstructed.

Subject in a downward direction to the pressure in the pipe 28 is a flexible diaphragm 33 which is clamped at its periphery between portions of the housing of the valve 19, and which is connected at its center to a thrust disk 34. A downwardly extending stem 35 is guided in the threaded spring seat 36. The seat 36 may be turned to adjust the stress on the coil compression spring 37 which urges the diaphragm upward. Projecting upward above the diaphragm 33 is a fluted pilot 38. This terminates in a thrust pin 39 which, in the upper position of the diaphragm, engages the ball check valve 31 and holds it above its seat so that it cannot close.

Assuming that the main reservoir is charged to a pressure of 100 lbs. gauge, the stress of spring 37 will be adjusted so that it will permit the valve 31 to close at some lower pressure, say 60 lbs. Thus, if the stop valve 18 is open, the full main reservoir pressure may be developed in the brake pipe 16, whereas if the stop valve 18 is closed, the maximum pressure which may be developed in the brake pipe is 60 lbs.

The brake pipe 16 is connected to two brake cylinders, one of which for the leading car is indicated at 41, and another for the trailing car is indicated at 42. Brake pipe 16 is connected from car to car by the usual hose 43. Angle cocks 44 of ordinary form are provided and perform the usual functions.

To sand braked wheels on the leading or motor car there are provided a pair of sand traps 45M, and to sand the wheels braked by the brake cylinder 42 on the trailer car are a pair of sand traps 45T. To control the operation of the sand traps 45M there is provided an electrically controlled sanding relay 46M, and to perform the same function for the traps 45T there is a secondary and identical relay 46T. The relays and their controlled sanders are inoperative except when electric windings forming parts of the relays are energized. The winding for the relay 46M is indicated at 47M, and for the relay 46T at 47T. Since the relays and sanders are identical, a brief description of the operation of the unit on the motor car will suffice.

The relay is supplied with air by a branch of the pipe 12, and when the winding 47M is energized delivers air first and for a short period to a clean-out pipe 48 and then to a sander operating pipe 49. When the winding is de-energized, the supply of air to the sanding pipe 49 is cut off and a brief blast is again delivered to the pipe 48 to blow the sand hose clear of sand. No novelty is claimed for these traps and in fact any preferred trap and relay might be substituted. The sander operates to deliver sand to the rail so long as air is supplied to the pipe 49, and flow stops when the supply of air stops.

Each of the traps 45M has a sand box 51M which must afford a supply of sand if the sand traps are to be operative. To sense the presence or absence of sand, each of the sand boxes 51 is provided with a pressure responsive switch which is enclosed in a housing 52.

Referring now to Fig. 3, the housing 52 is bolted to the corresponding sand box 51 over an aperture 53, and extending across this aperture is a flexible diaphragm 54 of rubber-like material. A headed thrust stem 55 is urged inward relatively to the sand box 51 by a light coil compression spring 56. If the sand box is properly filled with sand the weight of the sand will force the stem 55 outward and close the contactor 57 against the contact 58. Substantial depletion of sand will allow the stem 55 to move inward and will permit the contactor 57 to retreat and break the connection with the contact 58.

An electric conductor 59 extends through the train and is shown grounded at 61 at the rear of the train. It is connected between the cars by the separable connectors 62. Its function is to connect in series all of the switches in the housings 52 so that if any one of these switches opens, the circuit through the conductor 59 will be interrupted. There is also a sanding conductor 63 which extends through the train. It is connected between cars by the separable connector 64. Leading from the conductor 63 are branch connections 65 which lead to the windings 47M and 47T, respectively, the other terminal of each of these windings being grounded as indicated at 66.

Interposed in the conductor 63 on the motor car is a pressure operated switch generally indicated at 67. This contains a piston 68 which is subject on its lower side to pressure from the straight air pipe 16, a branch connection 69 being provided for that purpose. When the piston 68 is forced upward, a contactor 71 bridges the contacts 72 and closes the circuit through the normally interrupted conductor 63. A coil compression spring 73 loads the piston 68 so that the circuit will be completed only when straight air pipe pressure exceeds the desired value. In this way sanding will be provided automatically for heavy applications and will not be provided for light applications. If this differentiation is not desired, the springs 73 may be made so light that any effective braking pressure in the straight air pipe will close the switch.

A manually operated push button switch 74 may be provided and is connected in parallel with the pressure switch. The switch 74 will normally be located near the engineer's brake valve 13, but to avoid complicating the drawing the exact location of the switch 74 is not indicated.

On the motor car the forward end of the conductor 59 leads through the winding 75 of a relay switch whose armature or contactor is indicated at 76. This contactor and the other terminal of the winding 75 are connected through a normally closed manual switch 77 with one terminal of a battery 78 whose other terminal is grounded, as indicated. The battery typifies any suitable source of current.

If all the sand boxes 51 are properly filled, winding 75 will be excited and the contact 76 will be held up against the contact 79 with which the conductor 63 is connected. This conditions the sander circuit to operate. The pressure switch 67 will cause it to operate whenever a brake application of sufficient intensity is made. However, if any of the sand boxes 51 be depleted so that its related safety switch opens, the circuit through the winding 75 will be interrupted and the contactor 76 will drop, connecting the battery 78 with the lower contact 81 of the relay.

From the contact 81 there are two paths to ground. One of these leads through a warning light 82 whose function is to warn the engineer that the sanding system is inoperative and that his brake system is set for low maximum application. The other path from contact 81 leads through the winding 83 of a magnet valve which controls the pressure on the diaphragm 23 and which functions to admit main reservoir pressure from the pipe 12 against the diaphragm whenever the winding 83 is excited.

In the valve body 84, on which the winding 83 is mounted, is a chamber 85 with which the pipe 26 communicates. Below the chamber 85 is a supply chamber 86 with which a branch of the pipe 12 communicates. Leading from the top of the chamber 85 is an exhaust port 87. When the winding 83 is deenergized a double beat poppet valve having a supply head 88 and an exhaust head 89 isolates chamber 85 from the supply chamber 86 and vents the chamber 85. When winding 83 is energized the exhaust port is closed, the supply port is open, and diaphragm 23 is subjected to pressure to interrupt the direct connection from the engineer's brake valve to the straight air pipe.

From the description above given it will be seen that so long as the sand boxes are properly charged with sand, the brake system will operate at pressure up to the maximum afforded by the main reservoir. On the other hand, if any of the sand boxes is empty or so nearly empty as to be ineffective, a warning signal will light in the cab, the sanding circuit will be rendered inactive, and the pressure limiting valve will be interposed between the engineer's brake valve and the straight air pipe so that only the lower braking pressure here assumed to be 60 lbs. may be developed in the brake cylinders. Thus so long as the sanding system is operative, the brakes may be operated with full force. If any component of the sanding system is inoperative because of the lack of sand, the sanding circuit is interrupted and the braking system is subjected to the pressure limiting action of the valve 19.

As above suggested, the safety control system here described as applied to a very simple brake system may be similarly applied to other and more complicated systems, and while it has been disclosed with a sand charge operated switch, the same switch principle can be elaborated and modified almost without limit. In fact, safety switches, of which the switches in the housings 52 are typical, are subject to very wide variation to suit them for use with various components of sand traps whose condition might indicate inoperativeness. For this reason the simple system described in detail for purposes of disclosure should be taken as illustrative and not limiting, the scope of the invention being much broader than any particular application thereof.

What is claimed is:

1. The combination of a braking unit for the wheels of a vehicle; a sanding unit for sanding wheels so braked; means operable to limit the intensity of application produced by operation of the braking unit to a value less than the normal value; and means rendered effective by an inoperative condition of the sanding unit for rendering said limiting means effective.

2. The combination of a braking unit for the wheels of a vehicle, said unit being operable to produce brake applications of different intensities; a sanding unit for sanding the wheels so braked; an interconnection between said braking and sanding units adapted to operate the sanding unit when the braking unit operates to produce applications; and means responsive to an inoperative condition of the sanding unit and serving when the sanding unit is inoperative to limit the maximum intensity of brake application which may be produced by said braking means.

3. The combination of a braking unit for the wheels of a vehicle; a sanding unit for sanding wheels so braked; sander control means responsive to intensity of application produced by the braking unit and serving to cause operation of the sander unit as an incident to brake applications which exceed a given intensity; normally inactive means for limiting the intensity of applications produced by said braking unit; and means responsive to an inoperative condition of the sander unit to render the limiting means active.

4. The combination of a braking unit for the wheels of a vehicle; a sanding unit for sanding wheels so braked; sander control means responsive to intensity of application produced by the braking unit and serving to cause operation of the sander unit as an incident to brake applications which exceed a given intensity; normally inactive means for limiting the intensity of applications produced by said braking unit; a signal device; and means responsive to an inoperative condition of the sander unit to render the limiting means and the signal device both active.

5. The combination of an engineer's brake valve; a brake pipe connected with said brake valve so that the valve serves to control the pressure on the pipe; brake applying means associated with said brake pipe and controlled by changes of pressure therein, the degree of brake application depending on the brake pipe pressure; sanding means associated with each brake applying means; means controlled by brake pipe pressure for rendering said sanding means active when the brake applying means are active; limiting means for modifying the control of brake pipe pressure by the engineer's brake valve to limit the maximum intensity of braking action to a portion of its normal value; and means responsive to an inoperative condition of the sanding means serving to render said limiting means active.

6. The combination of an engineer's brake valve; a brake pipe connected with said brake valve so that the valve serves to control the pressure on the pipe; brake applying means associated with said brake pipe and controlled by changes of pressure therein, the degree of brake application depending on the brake pipe pressure; sanding means associated with each brake applying means; means controlled by brake pipe pressure for rendering said sanding means active when the brake applying means are active; limiting means for modifying the control of brake pipe pressure by the engineer's brake valve to limit the maximum intensity of braking action to a portion of its normal value; a signal adjacent said engineer's brake valve; and means responsive to an inoperative condition of the sanding means serving to operate said signal and render said limiting means active.

7. The combination of a braking unit for the wheels of a vehicle; a sand reservoir; a sanding unit for delivering sand from said reservoir to wheels so braked; electrically controlled means serving when active to limit the intensity of application produced by the braking unit to a value less than the maximum attainable value;

and switch means responsive to depletion of sand in said reservoir to render said electrically controlled means active.

8. The combination of a train braking system for braking wheels throughout a train; a train sanding system including a series of sanding units for sanding braked wheels throughout such train; means for controlling the brake system and the sanding system whereby they may be operated in unison; limiting means for imposing a relatively low limit on brake applications; electric means which when energized inhibit the operation of said limiting means; a train circuit for maintaining said electric means energized; normally closed switches interposed in said circuit, one for each sanding unit; and means, one responsive to the condition of each sanding unit and each arranged to open a corresponding switch and thus interrupt said circuit if the sanding unit be inoperative.

9. The combination of a braking unit for the wheels of a vehicle; a sanding unit for the wheels so braked; normally inactive means for limiting the range of intensity through which the brakes may be applied; and means responsive to an inoperative condition of the sanding unit arranged to render said limiting means active.

10. The combination of a braking system made up of a plurality of braking units on a vehicle or train of connected vehicles; means for controlling said system as an entirety; normally inactive limiting means affecting the entire braking system and serving when active to limit the range of intensity through which the brakes may be applied; sanding units, one associated with each braking unit; means responsive to an inoperative condition of each sanding unit; and connections between said responsive means and said limiting means whereby inoperativeness of any sanding unit serves to render said limiting means active.

CARRIE E. CAMPBELL,
*Administratrix of the Estate of Charles A. Campbell, Deceased.*